US009191359B2

United States Patent
Vendrow et al.

(10) Patent No.: US 9,191,359 B2
(45) Date of Patent: *Nov. 17, 2015

(54) TECHNIQUES FOR VOIP PROVIDER INTERCONNECTION OVER THE INTERNET USING A SHARED SUBSCRIBER CONTACT IDENTIFIER TRANSLATION SERVICE

(71) Applicant: RingCentral, Inc., San Mateo, CA (US)

(72) Inventors: Vlad Vendrow, Redwood Shores, CA (US); Christopher Van Rensburg, San Mateo, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,667

(22) Filed: Dec. 10, 2014

(65) Prior Publication Data

US 2015/0281169 A1    Oct. 1, 2015

Related U.S. Application Data

(63) Continuation of application No. 14/231,333, filed on Mar. 31, 2014, now Pat. No. 8,937,941.

(51) Int. Cl.
*H04L 12/66* (2006.01)
*H04L 12/28* (2006.01)
(Continued)

(52) U.S. Cl.
CPC ........... *H04L 61/1529* (2013.01); *H04M 7/006* (2013.01)

(58) Field of Classification Search
CPC .............. H04L 12/1482; H04L 29/06326; H04L 29/12594; H04L 51/20; H04L 61/106; H04L 61/1529; H04L 61/157; H04L 61/2514; H04L 61/2575; H04L 61/2589; H04L 61/301; H04L 63/08; H04L 63/0281; H04L 65/1023; H04L 65/1046; H04L 65/1069; H04L 67/16; H04L 67/18; H04L 67/306; H04L 2012/6472; H04L 2012/6481; H04L 29/12188; H04L 29/12433; H04L 29/12509; H04L 45/02; H04L 61/1588; H04L 61/2539; H04L 61/2567; H04L 63/0272; H04L 65/1016; H04L 65/1006; H04L 67/104; H04L 67/289; H04L 67/327; H04L 67/1065; H04W 4/02; H04W 4/023; H04W 8/02; H04W 8/26; H04W 12/06; H04W 64/00; H04W 76/02; H04W 2242/30; H04W 8/06; H04W 8/082; H04W 8/12; H04W 8/18; H04W 8/20; H04W 76/045; H04W 80/04; H04W 88/18; G06F 17/30864; G06F 7/30283; G06F 17/30392; G06F 17/30401; G06F 17/3097; G06F 17/30976; H04M 2203/2011; H04M 2207/12; H04M 7/003; Y10S 707/99933; Y10S 707/99945
USPC ................. 370/259–262, 310–350, 352–354, 370/389–401; 709/220–222, 227–229
See application file for complete search history.

(56) References Cited

U.S. PATENT DOCUMENTS 6,334,126 B1   12/2001   Nagatomo et al.
6,337,858 B1   1/2002    Petty et al.
(Continued)

*Primary Examiner* — Tri H Phan
(74) *Attorney, Agent, or Firm* — Finnegan, Henderson, Farabow, Garrett & Dunner LLP

(57) ABSTRACT

A computer-implemented method, an apparatus and a recording medium are provided for facilitating access by a subscriber over a communications network. The method comprises: acquiring a query message comprising a subscriber contact identifier associated with the subscriber; responsive to acquiring the query message: identifying a plurality of communications endpoint identifiers associated with the subscriber contact identifier, each communications endpoint identifier being associated with a communications device and reachability information, wherein the reachability information reflects a degree of subscriber accessibility via the communications device; and providing a response to the query message comprising at least one of the plurality of the communications endpoint identifiers, wherein the at least one of the plurality of the communications endpoint identifiers is selected based at least in part on the reachability information. The recording medium comprises instructions to configure the apparatus to perform the method.

20 Claims, 5 Drawing Sheets

(51) Int. Cl.
    *H04L 29/12*           (2006.01)
    *H04M 7/00*            (2006.01)

(56) References Cited

U.S. PATENT DOCUMENTS

| | | | |
|---|---|---|---|
| 6,836,476 B1 | 12/2004 | Dunn et al. | |
| 6,892,069 B1 * | 5/2005 | Flynn | 455/432.1 |
| 6,914,964 B1 * | 7/2005 | Levine | 379/52 |
| 8,060,492 B2 * | 11/2011 | Nair et al. | 707/709 |
| 8,090,840 B2 | 1/2012 | Jackson | |
| 8,180,045 B2 * | 5/2012 | Coppage | 379/355.04 |
| 8,205,245 B2 | 6/2012 | Tam et al. | |
| 8,254,551 B2 | 8/2012 | Heinze et al. | |
| 8,532,089 B2 | 9/2013 | Dalrymple et al. | |
| 8,639,754 B2 | 1/2014 | Vendrow | |
| 8,640,035 B2 * | 1/2014 | Pabla et al. | 715/758 |
| 8,693,655 B1 * | 4/2014 | Chau et al. | 379/201.01 |
| 8,707,394 B2 | 4/2014 | Tam et al. | |
| 8,924,508 B1 * | 12/2014 | Medved et al. | 709/217 |
| 8,937,941 B1 * | 1/2015 | Vendrow et al. | 370/352 |
| 2006/0135137 A1 * | 6/2006 | Chung | 455/415 |
| 2007/0127700 A1 * | 6/2007 | Chen et al. | 379/355.01 |
| 2007/0276799 A1 * | 11/2007 | Kalervo et al. | 707/3 |
| 2014/0143317 A1 | 5/2014 | Vendrow | |

* cited by examiner

TECHNIQUES FOR VOIP PROVIDER INTERCONNECTION OVER THE INTERNET USING A SHARED SUBSCRIBER CONTACT IDENTIFIER TRANSLATION SERVICE

This application is a continuation of U.S. application Ser. No. 14/231,333, filed Mar. 31, 2014, the content of which is incorporated herein by reference in their entirety.

FIELD

The present disclosure relates generally to a translation service for enabling communications over a data network such as the Internet, and more specifically, to computer-implemented techniques for Voice over IP ("VoIP") provider interconnection over the Internet using a shared subscriber contact identifier translation service.

BACKGROUND

VoIP technology converts voice and video signals into network packets. The network packets are transported using various Internet Protocol ("IP")-based protocols. The Internet Protocol, also referred to as "IP", is the principal communications protocol in the Internet protocol suite for relaying datagrams across network boundaries. Its routing function enables internetworking, and essentially establishes what is commonly referred to as the Internet. The Internet is the global system of interconnected computer networks that use the standard Internet protocol suite. The Internet may be thought of as a network or networks that include many private, public, academic, business, and government networks, of local to global scope, that are linked by a broad array of electronic, wireless, and optical networking technologies.

VoIP providers provide VoIP-based services using VoIP technology for transporting voice and video from subscribers to the VoIP provider premises. VoIP-based services can be accessed through a managed IP network such as, for example, an IP network owned by the VoIP provider. VoIP based services can also be accessed through a public IP network such as, for example, the Internet.

DETAILED DESCRIPTION

Figure 1:
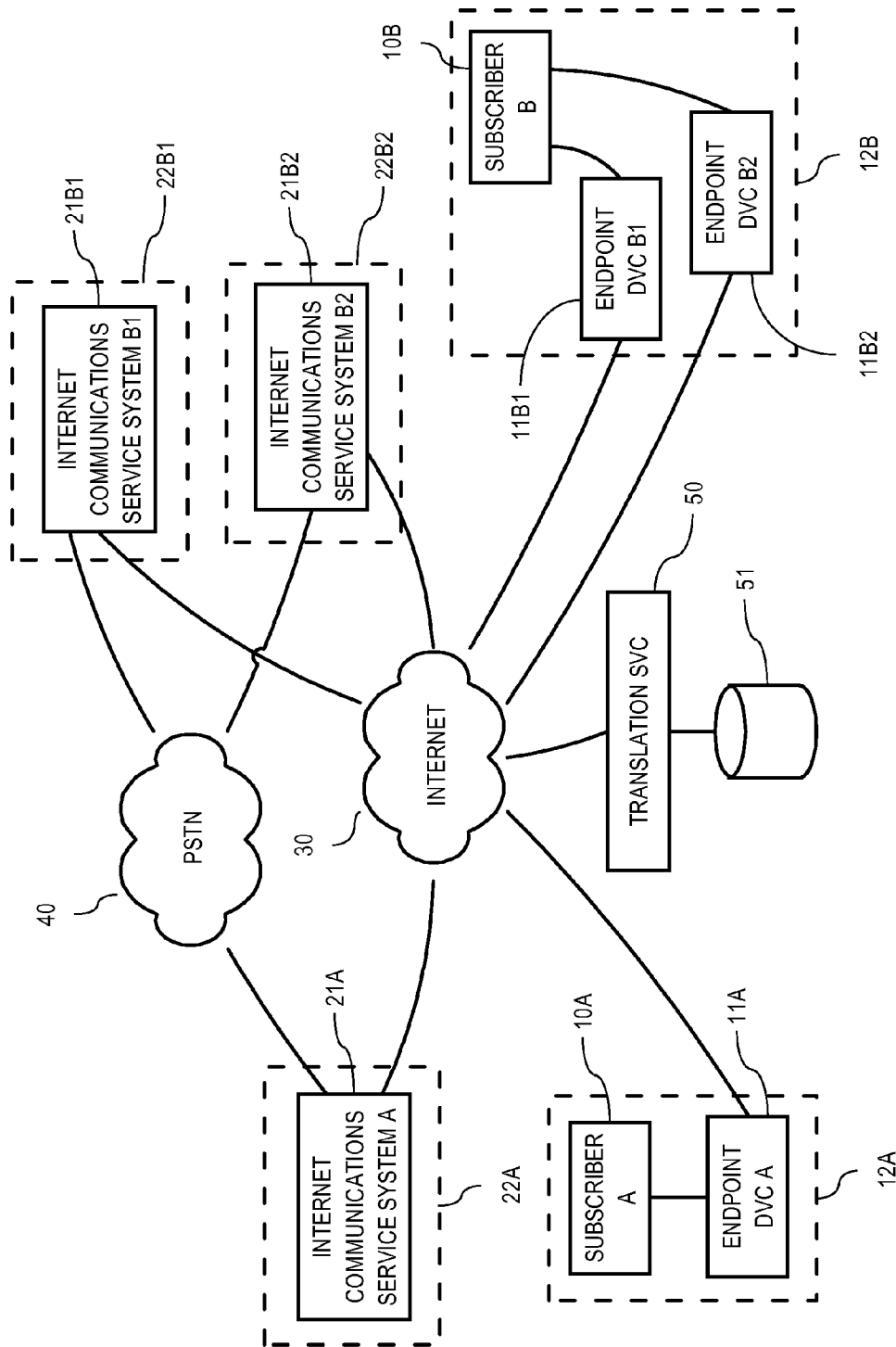
FIG. 1 is a block diagram of a networked computing environment in which example embodiments of the present disclosure are implemented.

Computer-implemented techniques for VoIP provider interconnection over the Internet using a shared subscriber contact identifier translation service are disclosed.

One challenge facing VoIP providers is interconnection. In the VoIP context, interconnection refers to the linking of two networks using IP. The two networks can be owned or managed by different VoIP providers. For example, interconnection may be necessary when a subscriber of one VoIP provider wishes to establish a VoIP telephone call with a subscriber of a different VoIP provider.

Traditionally, interconnection has been accomplished through the public switched telephone network. The public switched telephone network, also referred to as the "PSTN", is the aggregate of the world's circuit-switched telephone networks that are operated by national, regional, or local telephone operators, providing infrastructure and services for public telecommunication. In the context of interconnection, the PSTN is often used as the transit network between the originating network of one VoIP provider and the terminating network of another VoIP provider. Interconnection through the PSTN has a number of disadvantages. For example, a VoIP telephone call between a VoIP originating provider and a VoIP terminating provider must be signal converted twice for transport over the PSTN, once between the VoIP originating provider and the PSTN and another time between the PSTN and the VoIP terminating provider. Relatedly, capital expenditures are increased for VoIP providers. The VoIP providers are typically required to invest in conversion equipment for connecting their networks to the PSTN. Further, PSTN providers may charge fees to originating VoIP providers for using the PSTN for interconnection under a calling party pays business model.

Given the drawbacks associated with using the PSTN for interconnection, VoIP providers have sought solutions that provide interconnection without using the PSTN as the transit network. For example, a VoIP provider may consult a database to resolve a dialed PSTN telephone number (i.e., an E.164 number) into a uniform resource identifier ("URI") that can be used for example in telephone call setup over the Internet. In this way, interconnection between the originating VoIP provider and the terminating VoIP provider is accomplished using the Internet as the transit network, as opposed to the PSTN. Unfortunately, the usefulness of such resolution databases is often limited by their relatively static nature. For example, information in the database may be incorrect or out-of-date or incomplete.

Accordingly, the present disclosure provides for VoIP provider interconnection over the Internet using a shared subscriber contact identifier translation service. Advantageously, techniques disclosed herein may be used by a VoIP provider to bypass the PSTN as the transit network for interconnection between VoIP providers. In addition, techniques disclosed herein allow an Internet communications service system, the translation service, or another network entity to select one of multiple communications endpoint identifiers associated with a subscriber contact identifier to use for communications. The selection can be based on reachability information associated with the communications endpoint identifiers. However, the selection can be based on more than just reachability. For example, in addition to or instead of selecting a communications endpoint identifier based on associated reachability information, a selection can be based on network routing preferences, subscriber communication mode preferences, subscriber communication responsiveness, and criteria other than just reachability.

Introduction

Referring to the figures, example embodiments of the present disclosure will now be described. In the following description, for the purposes of explanation, numerous specific details are set forth in order to provide a thorough understanding of the present disclosure. It will be apparent, however, that the present disclosure may be practiced without these specific details. In other instances, structures and devices are shown in block diagram form in order to avoid unnecessarily obscuring the present disclosure. The example embodiments are primarily described with reference to block diagrams of flowcharts. As to the flowcharts, each block within the flowcharts represents both a method step and an apparatus element for performing the method step. Depending upon the requirements of the particular implementation at hand, the corresponding apparatus element may be configured in hardware, software, firmware, or combinations thereof.

Overview

Embodiments of the present disclosure provide a shared subscriber contact identifier translation service for facilitating communications over the Internet between subscribers of different VoIP providers. More specifically, the translation service provides a translation database on a data network. The translation database associates subscriber contact identifiers with Internet contact information for the subscribers. In some embodiments of the present disclosure, the subscriber contact identifiers in the translation database include 1) PSTN telephone numbers (e.g., E.164 numbers), 2) private subscriber identifiers for VoIP services (e.g., Skype® identifiers), 3) e-mail addresses, or 4) session initiation protocol (SIP) addresses (e.g., a SIP URI). The session initiation protocol, or "SIP", is a signaling communications protocol used for controlling multimedia communication sessions such as voice and video calls over IP networks. The Internet contact information associated in the translation database with a subscriber contact identifier includes a set of one or more communications endpoint identifiers of Internet communications services through which the subscriber may be reachable by communications over the Internet. In some embodiments of the present disclosure, a communications endpoint identifier is an e-mail address or a SIP address (e.g., a SIP URI).

While in some embodiments a subscriber contact identifier is an E.164 number, a private VoIP subscriber identifier, an e-mail address, or a SIP URI, a subscriber contact identifier is an Internet chat service user identifier or a social network service user identifier in other embodiments. For example, a subscriber contact identifier could be an internet relay chat (IRC) user identifier, a Yahoo!® Messenger® (YMSG) user identifier, an AOL® Instant Messenger® (AIM) user identifier, or a Facebook® user identifier. Similarly, while a communications endpoint identifier is an e-mail address or a SIP URI in some embodiments, a communications endpoint identifier, more generally, can be any information identifying a resource or communications service on the Internet. In some cases a communications endpoint identifier, in addition to identifying a resource or communications service on the Internet, specifies a location (e.g., an address) on the Internet where the resource or communications service is located. In other cases a communications endpoint identifier can be resolved for example using the domain name system to a location or address on the Internet.

In some embodiments of the present disclosure, the translation service provides a query interface, accessible over a network, for resolving a given subscriber contact identifier to Internet contact information for the subscriber. In response to a query to resolve a subscriber contact identifier, the translation service consults the translation database for the Internet contact information associated with the specified subscriber contact identifier. The associated Internet contact information, or a portion thereof, is then returned to the querier. The querier can then use the returned Internet contact information to establish communications with the subscriber over the Internet. In some embodiments, the querier is an "originating" VoIP provider that is attempting to establish Internet communications for an "originating" subscriber with a "terminating" subscriber as identified by the subscriber contact identifier.

According to some aspects of the present disclosure, a communications endpoint identifier of an Internet communications system associated in the translation database with a subscriber contact identifier is further associated in the translation database with reachability information pertaining to the reachability of the subscriber through the Internet communications system. Where a subscriber contact identifier is associated in the translation database with multiple communications endpoint identifiers, the querier can use the reachability information to select one the multiple resource identifiers through which the subscriber is most likely to be reached. Alternatively, the translation service can use the reachability information to select the best one of the multiple resource identifiers to return to the querier.

In some embodiments of the present disclosure, the reachability information for a communications endpoint identifier includes subscriber presence information, Internet communications system quality-of-service (QoS) information, Internet traffic/congestion information, and/or subscriber preference information. Subscriber presence information may indicate for example if the subscriber is currently online or logged into the Internet communications system associated with the communications endpoint identifier. Quality-of-service information and Internet traffic/congestion information may indicate for example the overall performance of the Internet communications system associated with the communications endpoint identifier from the perspective of the users of the system on the network. Subscriber preference information may indicate for example a level of preference of the subscriber to be contacted through the Internet communications system associated with the communications endpoint identifier. The level of preference may be any information that may be used to rank or order multiple communications endpoint identifiers through which the subscriber can be contacted.

While in some embodiments reachability information associated with a communications endpoint identifier comprises subscriber presence information, QoS information, network traffic/congestion information, and/or subscriber preference information, reachability information associated with a communications endpoint identifier comprises responsiveness information in other embodiments. For example, a communications endpoint identifier can be associated with responsiveness information indicating, specifying, or reflecting an observed or detected pattern of communication responsiveness associated with the communications endpoint identifier. In some embodiments, the responsiveness information comprises an estimated time to acknowledge receipt of communications sent to the communications endpoint identifier for example an estimated time for the subscriber associated with the communications endpoint identifier to read, view, or listen to incoming communications. In some embodiments, the responsiveness information comprises an estimated likelihood of response from the subscriber associated with the communications endpoint identifier to communications sent to the communications endpoint identifier. In other embodiments, the responsiveness information comprises an estimated time for response from the subscriber associated with the communications endpoint identifier to communications sent to the communications endpoint identifier. Responsiveness information associated with a communications endpoint identifier may inform the communications endpoint identifier's reachability conclusion in the sense of how likely a communication sent to the communications endpoint identifier will be acknowledged and responded to in a timely manner.

In some embodiments, the translation service provides a management interface, accessible over a network, for updating reachability information associated in the translation database with a communications endpoint identifier. For example, a first VoIP provider can monitor the current availability or presence of its subscribers. Then, the first VoIP provider can access the management interface of the translation service to update the presence information in the translation database associated with the subscribers. In this way, when a second VoIP provider uses the query interface of the translation service to obtain Internet contact information for a subscriber whose presence information has been recently updated in the translation database by the first VoIP provider, the second VoIP provider can receive in response to the query current presence information for determining whether the subscriber can currently be reached through the first VoIP provider.

In some embodiments, an association between a subscriber contact identifier (e.g., a E.164 number) and a subscriber of a VoIP service provider can be registered automatically with the translation service upon installation of the VoIP service provider's mobile application on the subscriber's mobile device. In some embodiments, the subscriber grants the VoIP service provider's mobile application the required application permissions to access, at or from the mobile device, the information regarding the subscriber contact identifier during installation of the application or on subsequent usage of the application. Alternatively, the subscriber may be prompted during installation or subsequent usage of the mobile application to manually enter the subscriber contact identifier. The subscriber contact identifier, along with the subscriber's VoIP communication endpoint identifier, can be reported to the translation service for storage in the translation database. The reporting can be performed by the mobile application or the VoIP provider, for example, upon receiving the subscriber contact identifier from the mobile application. Once the association between the subscriber contact identifier and the communications endpoint identifier has been established in the translation database, the translation service can provide, for example, to other querying subscribers and other querying VoIP providers, the communications endpoint identifier associated with the subscriber contact identifier. Thus, in accordance with some embodiments, simply by installing the mobile application on the mobile device the subscriber is made discoverable, through the translation service, for Internet communications using the subscriber contact identifier. In some embodiments, in addition to registering with the translation service an association between a subscriber contact identifier and a communications endpoint identifier, reachability information for the communications endpoint identifier is also registered and stored in the translation database in association with the communications endpoint identifier.

Example Networked Computing Environment

By way of example illustrated in FIG. 1 is block diagram of a networked computing environment in which example embodiments of the present disclosure are implemented.

In this example, Subscriber A 10A at subscriber premises 12A wishes to communicate with subscriber B 10B according to a communication medium. The communication medium can be voice, video, e-mail, chat, teleconference, videoconference, text messaging, or any other computer-based communication medium compatible with techniques described herein. To communicate with subscriber B 10B, subscriber A 10A provides a known subscriber contact identifier to communications endpoint device A 11A used by subscriber A 10A. The subscriber contact identifier consists of any identifier suitable for contacting subscriber B 10B according to techniques described herein. For example, the subscriber contact identifier may be a PSTN telephone number (e.g., an E.164 phone number), an e-mail address, a user identifier specific to a particular communications application (e.g., a Skype® user identifier), or any other suitable identifier compatible with techniques described herein.

To receive the subscriber contact identifier from subscriber A 10A, communications endpoint device 11A executes or is configured with a communications application. Here, application refers to one or more sets of processor-executable instructions that implement particular functionality. In example embodiments, the communications application is a telephone application, a video application, an e-mail application, a chat application, a teleconferencing application, a videoconference application, a text messaging application, a game application, or any other communications application compatible with techniques described herein. The communications application provides or interfaces with a user interface of endpoint device 11A for receiving the subscriber contact identifier and for otherwise facilitating communications according to the particular communication medium at hand. One or more of the sets of executable instructions may be part of an operating system of communications endpoint device A 11A. Alternatively, all of the executable instructions may be part of an application that executes on communications endpoint device A 11A with the aid of the operating system.

Communications endpoint device A 11A is any computing device compatible with techniques described herein. For example, communications endpoint device A 11A can be a personal computer, a laptop computer, a mobile phone, a smart phone, a desktop computer, a workstation computer, a kiosk computer, a desk VoIP phone, a fax machine, a game console, or other mobile or stationary, wire or wireless computing device capable of coupling communicatively with the Internet 30.

Upon obtaining the subscriber contact identifier from subscriber A 10A, communications endpoint device A 11A provides the subscriber contact identifier over the Internet 30 to internet communications service system A 21A, in conjunction with or as part of a network request to establish communications with subscriber B 10B, as identified by the subscriber contact identifier. The network request may be made according to any suitable IP-based networking protocol appropriate for negotiating or establishing such communications. For example, the networking protocol may be the SIP protocol, the HyperText Transfer Protocol (HTTP) protocol, the Secure-HTTP (HTTPS) protocol, or any other IP-based networking protocol compatible with techniques described herein.

Internet communications service system A 21A is associated with (e.g., operated by) VoIP provider 22A. In the presently described example, subscriber A 10A holds an account with VoIP provider 22A as part of an Internet communications service provided by VoIP provider 22A to subscriber 10A. In this example, only one subscriber of VoIP provider 22A is depicted in FIG. 1. However, in a commercial embodiment, VoIP provider 22A may provide Internet communications services to multiple subscribers.

The Internet communications services provided by VoIP provider 22A through Internet communications system A 21A involves one or more communications media. For example, VoIP provider 22A may provide one or more of voice, video, e-mail, chat, fax, teleconference, videoconference, and text messaging services through Internet communications system A 21A.

Generally, Internet communications service system A 21A is implemented on or by one or more computing devices (e.g., server computers) hosted or co-located in one or more data centers that provide connectivity to the Internet 30. In example embodiments, the computing devices (e.g., web servers or SIP proxy servers) interface over the Internet 30 with communications endpoint devices of subscribers, like communications endpoint device A 11A. Other computing devices optionally provide back-end services (e.g., a data storage plane) to the computing devices that interface with communications endpoint devices. Still other computing devices include telephony and networking equipment for communicatively coupling to the PSTN 40. While in some embodiments internet communication service system A 21A is communicatively coupled to the PSTN 40, internet communications service system A 21A is not so coupled in other embodiments.

Upon obtaining the subscriber contact identifier from communications endpoint device A 11A, Internet communications service system A 21A contacts translation service 50 over the Internet for the purpose of obtaining Internet contact information associated in translation database 51 with the subscriber contact identifier. Such contact may be made according to any suitable IP-based networking protocol. For example, Internet communications service system A 21A may query translation service 50 according to the HTTP, HTTPS, or Domain Name System (DNS) protocols, as some possible examples. For example, Internet communications service system A 21A may send a query specifying the subscriber contact identifier in one or more IP-based networking protocol data packets to translation service 50 and receive corresponding Internet contact information in one or more returned IP-based networking protocol data packets.

Upon receiving the query from internet communications service system A 21A, translation service 50 consults translation database 51 for the purpose of mapping the provided subscriber contact identifier to Internet contact information associated with the subscriber contact identifier in the translation database 51. For this, translation database 51 may store a number of translation records. Each translation record corresponds to one subscriber contact identifier. In some example embodiments, the translation records is indexed or keyed in translation database 51 by the subscriber contact identifiers for fast access or lookup by translation service 50 using a given subscriber contact identifier as a key. The translation database 51 is any database suitable for storing translation records including for example a relational database, a directory store, a file, or other data storage format compatible with techniques described herein. Translation service 50 and translation database 51 are implemented on or by one or more computing devices (e.g., server computers) hosted or co-located in one or more data centers that provide connectivity to the Internet 30. In some embodiments, translation service 50 and translation database 51 is operated and maintained by a particular VoIP provider (e.g., VoIP provider 22A). In other embodiments, translation service 50 and translation database 51 are operated and maintained by a consortium or industry management group, which may or may not include one or more VoIP providers. More generally, translation service 50 and translation database 51 may be under the operation and management of one particular entity or a group of entities.

Once translation service 50 has consulted translation database 51 and mapped the subscriber contact identifier for subscriber B 10B provided by internet communications service system A 21A to corresponding Internet contact information for subscriber B 10B, translation service 50 returns the corresponding Internet contact information or a portion thereof to internet communication service system A 21A. Generally, the Internet contact information returned to internet communications service system A 21A can be any information suitable for establishing communications between subscriber A 10A and subscriber B 10B via a particular communication medium. According to some embodiments, the Internet contact information includes one or more communications endpoint identifiers for contacting subscriber B 10B. More specifically, each communications endpoint identifier corresponds to an Internet address on the Internet 30 of an Internet communications service system of a VoIP provider through which subscriber B 10B may be reachable via a communication medium. In some embodiments, a communications endpoint identifier is in the form of a Uniform Resource Identifier (URI) such as for example "sip:mary@somecompany.com", which is an example of a Session Initiation Protocol (SIP) URI. A uniform resource identifier, or "URI", is a string or characters identifying a network resource. In addition to identifying a network resource, a URI may also specify an access mechanism for accessing the network resource such as for example "sip" or "http". However, a communications endpoint identifier can take other character string forms such as for example, an e-mail address, a uniform resource locator (URL), or any other information suitable for identifying a resource on the Internet. For example, a communications endpoint identifier can a set of serialized parameter values for example in JavaScript Object Notation (JSON) format.

While in some embodiments an Internet communications service system is operated by a VoIP provider, an Internet communications service system is operated by other types of Internet service providers in other embodiments. Thus, embodiments of the present disclosure are not limited to Internet communications service systems operated by VoIP providers.

In addition to communications endpoint identifiers, the corresponding Internet contact information for the given subscriber contact identifier may include reachability information for one or more the communications endpoint identifiers of the corresponding Internet contact information. For this, translation service 50 can store subscriber reachability information for communications endpoint identifiers in translation database 51. Subscriber reachability information associated with a communications endpoint identifier in returned Internet contact information can indicate the reachability or unreachability of the corresponding communications endpoint identifier. The Internet contact information for subscriber B 10B obtained from translation database 51 and containing reachability information can be communicated to Internet communications system A 21A in response to the query from Internet communications system A 21A specifying the subscriber contact identifier for subscriber B 10B.

In some embodiments, reachability information associated with a communications endpoint identifier includes preferences, as registered by the subscriber, on use of specific modes of communication for different classifications of communications. For example, a communication targeted to the subscriber may be qualified as having a certain level of confidentiality, and the subscriber may have registered a preference for a communication mode for communications of a highly confidential nature. In situations of communication qualified as confidential, the preferred mode of communication for confidential matters may be selected by the translation service 50 even if it is not deemed to provide the highest degree of reachability. Similarly, Internet service providers may qualify certain communication of a promotional nature and this qualification may be provided as additional context in the process of selecting one from multiple modes of communication to a subscriber. Given that a subscriber may register a preference for a mode of communication to be used in cases of communication of a promotional or soliciting nature. Here again, the choice of communication mode may not favor the mode with the highest reachability.

As shown by example in FIG. 1, according to some embodiments, a subscriber identified by a subscriber contact identifier may use multiple communications endpoint devices for communications. For example, subscriber B 10B uses communications endpoint devices B1 11B1 and B2 11B2 at subscriber premises 12B. Communications endpoint devices B1 11B1 and B2 11B2 may be like communications endpoint device A 11A but may be different types of communications endpoint devices. For example, communications endpoint device B1 11B1 may be a mobile phone while communications endpoint device B2 11B2 may be a desktop or workstation computer.

In addition to using multiple communications endpoint devices, a subscriber identified by a subscriber contact identifier may hold accounts with multiple VoIP providers. For example, subscriber B 10B may hold separate accounts with VoIP providers 22B1 and 22B2 corresponding to Internet communications service systems B1 21B1 and B2 21B2, respectively. Internet communications service systems B1 21B1 and B2 21B2 may provide the same or different communication services to subscriber B 10B. For example, Internet communications service system B1 21B1 may provide voice, videoconferencing, and fax services to subscriber B 10B and Internet communications service system B2 21B2 may provide just voice services to subscriber B 10B.

Translation Service Providing Reachability Information

Figure 2:
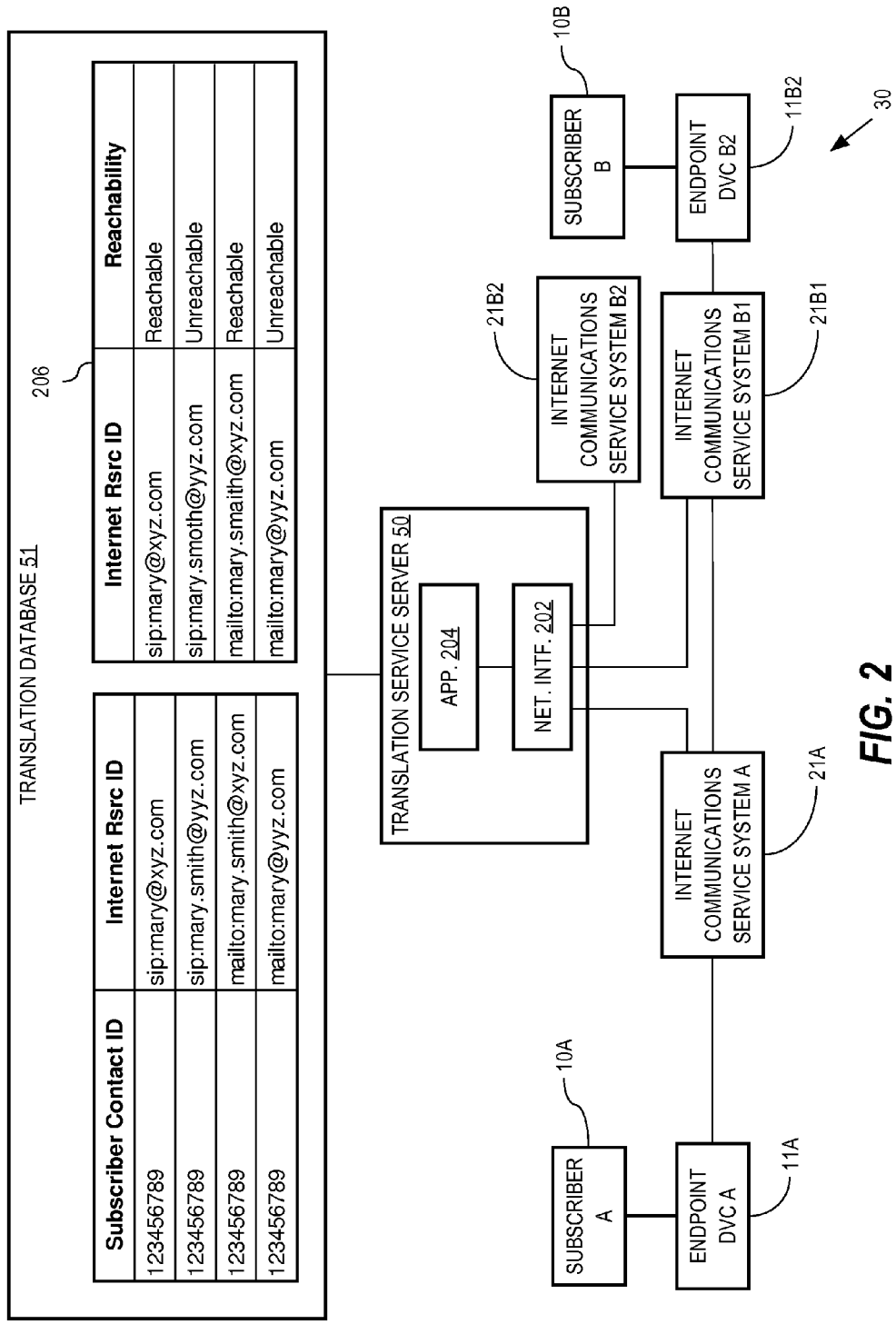
FIG. 2 illustrates a system for providing reachability information in conjunction with a translation service on the Internet, according to an example embodiment of the present disclosure.

Continuing the example of FIG. 1, FIG. 2 illustrates a system for providing reachability information in conjunction with a translation service on the Internet 30, according to an example embodiment of the present disclosure. Referring to FIG. 2, the system can include translation service server 50 in operable communication with the Internet 30. Internet 30 can include Internet communications service system A 21A for receiving signaling messages for establishing communication between communications endpoint device A 11A and an another communications endpoint device on the Internet 30 through another Internet communications service system. For example, Internet communications service system A 21A can receive message(s) from communications endpoint device A 11A and a subscriber identified by a subscriber contact identifier. Alternatively, Internet communications service system A 21A can receive messages from any suitable source for establishing communication with a subscriber identified by a subscriber contact identifier.

Internet communications service system A 21A determines whether a query of translation service server 50 is required based on whether the subscriber contact identifier corresponds to a subscriber that is not a subscriber of Internet communications service system A 21A or otherwise a subscriber of an Internet communications service provided by VoIP provider 22A. For example, Internet communications service system A 21A determines that a query of translation service server 50 is required based on determining that the subscriber contact identifier corresponds to a subscriber of another Internet communications service system of another VoIP provider. If Internet communications service system A 21A determines that a query is required, Internet communications service system A 21A transmits a query to translation service server 50. Translation service server 50 includes a query interface module 202 for receiving the query from Internet communications service system A 21A. The query contains the subscriber contact identifier. The subscriber contact identifier may be a called party telephone number, for example. Internet communications service system A 21A also includes a translation application 204 for performing a look up in translation database 51 for retrieving one or more communications endpoint identifiers and associated reachability information associated with the received subscriber contact identifier.

While in some embodiments an Internet communications service system determines whether a query of the translation service is required based on whether the subscriber contact identifier corresponds to a subscriber that is not a subscriber of the Internet communications service, an Internet communications service system queries the translation service where the subscriber contact indenter does correspond to one its subscribers. For example, it may be beneficial to perform a query of the translation service because of reachability issues as described earlier in this disclosure, or a query to the translation service may be performed as a fallback upon a failure to connect in-network to the destination subscriber.

Translation database 51 may include reachability information 206 containing reachability information for communications endpoint identifiers. In response to receiving the query from Internet communications service system A 21A, translation service server 50 performs a look up in reachability information 206 to retrieve reachability information for each of the communications endpoint identifiers. The retrieved reachability information for each communications endpoint identifier indicates, directly or indirectly, the reachability or unreachability associated with the communications endpoint identifier. Translation service server 50 transmits to Internet communications service system A 21A a response message containing the reachability information for one or more of the communications endpoint identifiers corresponding to the queried subscriber contact identifier.

In some embodiments, translation service server 50 responds to the query with only the communications endpoint identifiers that were indicated as reachable by the reachability information 206. Alternatively, translation service server 50 can respond to the query with the reachability information for all communications endpoint identifiers, even those that are unreachable.

In some embodiments, reachability is only one of multiple considerations in selecting one of multiple communications endpoint identifiers associated with a subscriber contact identifier. For example, despite reachability status of a communications endpoint identifier, the communications endpoint identifier may still be selected based on a requirement of the originating subscriber for the communication. For example, the communication may involve transmitting an image or video to a terminating subscriber via a live video stream. More generally, in addition to reachability associated with a communications endpoint identifier, urgency, confidentially, privacy, quality, cost, communication content (audio, image, video, etc.) of communications to be sent to the communications endpoint identifier can be other factors for selecting the communications endpoint identifier for communications.

In accordance with some embodiments, one of the communications endpoint identifiers identified as reachable in the response to Internet communications service system A 21A identifies a communications endpoint device B2 11B2 reachable through Internet communications service system B1 21B1. Internet communications service system A 21A utilizes the communications endpoint identifier for establishing communication over the Internet 30 between communications endpoint device A 11A and communications endpoint device B2 11B2. Alternatively, Internet communications service system A 21A can communicate the communications endpoint identifier to communications endpoint device A 11A for use by communications endpoint device A 11A for establishing communication over the Internet 30 between communications endpoint device B2 11B2.

In some embodiments, internet communications service systems B1 21B1 and B2 21B2 periodically or regularly communicate with translation service server 50 via network interface 202 for purpose of providing reachability information 206 for communications endpoint identifiers. The provided reachability information may include reachability data such as presence, quality-of-service, and/or priority for the communications endpoint identifiers from which a reachability conclusion (e.g., reachable or unreachable) can be calculated according for example to heuristic or other decision algorithm. Alternatively, the provided reachability information may include a reachability conclusion for each communications endpoint identifier.

Example Process for VoIP Provider Interconnection

Figure 3:
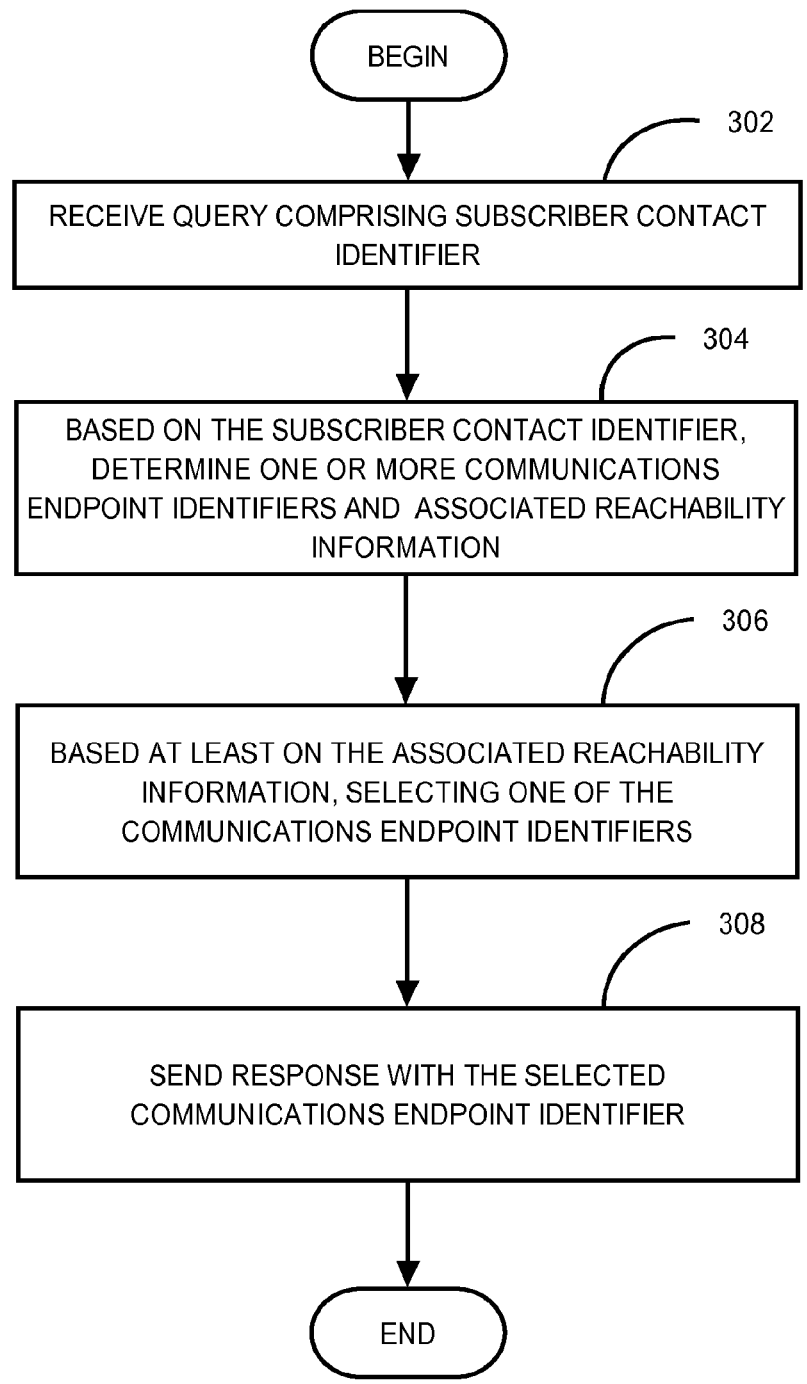
FIG. 3 is a flow chart illustrating steps for VoIP provider interconnection over the Internet using a shared subscriber contact identifier translation service, according to some example embodiments of the present disclosure.

FIG. 3 is a flow chart 300 illustrating example steps for VoIP provider interconnection over the Internet 30 using a shared subscriber contact identifier translation service, according to some embodiments of the present disclosure. Initially, an Internet communications service system, such as Internet communications service system A 21A, receives a subscriber contact identifier such as for example a E.164 number or an e-mail address.

Next, Internet communications service A 21A communicates (e.g. by sending) a query message to translation service 50. The query message can specify the subscriber contact identifier. The query may be implemented using an IP-based protocol. For example, the IP-based protocol can be a signaling protocol such as for example, SIP. The query is received by the translation service at step 302.

At step 304, translation service 50 utilizes the query message for performing a look up in translation database 51 to determine one or more communications endpoint identifiers associated with the received subscriber contact identifier. As shown in FIG. 2, example communications endpoint identifiers associated with subscriber contact identifier 123456789 include sip:mary@xyz.com, sip:mary.smith@yyz.com, and mailto:mary.smith@xyz.com, and mailto:mary@yyz.com.

Translation database 51 can maintain data for indicating reachability of the communications endpoint identifiers associated with the subscriber contact identifier. Accordingly, at step 304, in addition to utilizing the query message for performing a lookup to retrieve one or more communications endpoint identifiers associated with the received subscriber contact identifier, translation service 50 can utilize the query message for performing a look up in translation database 51 to retrieve reachability information for one or more of the communications endpoint identifiers associated with the received subscriber contact identifier. In the example shown in FIG. 2, the only communications endpoint identifiers currently reachable are the communications endpoint identifiers associated with xyz.com domain. In particular, the communications endpoint identifiers sip:mary@xyz.com and mailto:mary.smaith@xyz.com are reachable by the communications endpoint identifiers sip:mary.smoth@yyz.com and mailto:mary@yyz.com are not currently reachable.

In the example of FIG. 2, the reachability information associated with a communications endpoint identifier is a data indicating whether the corresponding communications endpoint identifier is reachable or unreachable. In other embodiments, the reachability information associated with a communications endpoint identifier is raw reachability information. Here, raw reachability information for a communications endpoint identifier refers any reachability information from which a reachability conclusion of "reachable" or "unreachable" can be computed, inferred, or derived. In some embodiments, the raw reachability information includes network quality-of-service information, subscriber presence information, and/or subscriber preference information. Quality-of-service information can include any quantitative or qualitative measure of the network quality of service (e.g., error rates, bandwidth, throughput, transmission delay, availability, jitter, etc.) that network communications with network endpoints associated with the communications endpoint identifier may be expected to experience. Subscriber presence information can include any information indicating the availability or status (e.g., "available", "away", "offline", "online", etc.) of a subscriber associated with the communications endpoint identifier. Subscriber preference information can include information on the preference of the subscriber associated with the communications endpoint identifier to be contacted for communications through the communications endpoint identifier.

At step 306, the translation service selects one of the communications endpoint identifiers based at least on the reachability information associated with the communications endpoint identifiers. According to some example embodiments, the translation service 50 applies a heuristic algorithm to determine a reachability of status for a communications endpoint identifier of "reachable" or "unreachable" based on raw reachability information obtained for the communications endpoint identifier. In other examples, the translation service 50 learns about a pattern of reachability for a subscriber based on, for example, prior reachability status over a period of time. In some embodiments, reachability information is probabilistic or continuous in nature, based upon a past historical pattern of behavior with a given communications endpoint identifier, such that reachability values of multiple possible communications endpoint identifiers for the same subscriber may be fed into a computation that determines the best choice of communications endpoint identifier for that subscriber based upon highest computed match score for each of the possible communications endpoint identifiers for that subscriber, taking into account all the selection criteria and weights and importance assigned to each of the selection criteria.

At step 308, the translation service 50 returns a response to the query from the Internet communications service system. The response includes at least the selected communications endpoint identifier. The response can also include the one or more communications endpoint identifiers retrieved from the translation database 51 associated with the subscriber contact identifier. In addition, for one or more of the communications endpoint identifiers, the response may also include reachability information for the communications endpoint identifier. The reachability information can be a reachability conclusion for the communications endpoint identifier. In addition or alternatively, the reachability information can be raw reachability information (e.g., quality of service, presence, or preference information) from which the querying Internet communications service system can apply a heuristic algorithm to determine a reachability conclusion for the communications endpoint identifier.

In some embodiments, the Internet communications service system uses the response to the query to establish VoIP call between a called party and a calling party. For example, Internet communications service system A 21A receives a SIP invite message from communications endpoint device A 11A in response to subscriber A 10A (the calling party) providing a subscriber identifier (e.g., an E.164 number) for subscriber B 10B (the called party) to communications endpoint device A 11A. The SIP invite message specifies the subscriber contact identifier. In response to receiving the SIP invite message, Internet communications service system A 21A queries translation service 50 for Internet contact information associated with the subscriber contact identifier. The translation service 50 returns in response to the query Internet contact information associated in the translation database 51 with the subscriber contact identifier. For example, the returned Internet contact information may specify two SUP URIs and associated reachability information. Internet communications service system A 21A uses the reachability information associated with the two SIP URIs returned in response to the query to select one of the SIP URIs for establishing a VoIP call with subscriber B 10B. For the example, the reachability information may indicate that subscriber B 10B is currently reachable through one of the SIP URIs but is currently not reachable through the other of the two SIP URIs. Accordingly, the Internet communications service system A 21A sends a SIP invite message for establishing a VoIP call between subscriber A 10A and subscriber B 10B to the Internet communication service system associated with the currently reachable SIP URI. In this way, the translation service 50 facilitates VoIP provider interconnection over the Internet 30 using the translation service 50.

In some embodiments, reachability information in translation database 51 is used to establish a multi-party VoIP call. For example, the translation database 51 may store reachability information for a SIP conference URI such that an Internet communications service system that is attempting to connect a calling party to a conference call at the SIP conference URI can use the reachability information associated with the SIP conference URI to connect the calling party to the conference call over the Internet.

Providing Reachability Status Changes

According to some embodiments, an Internet communications service system provides reachability information about communications endpoint identifiers associated with its subscribers to translation service 50. In these embodiments, the Internet communications service system may report reachability status changes of communications endpoint identifiers associated with its subscribers.

Figure 4:
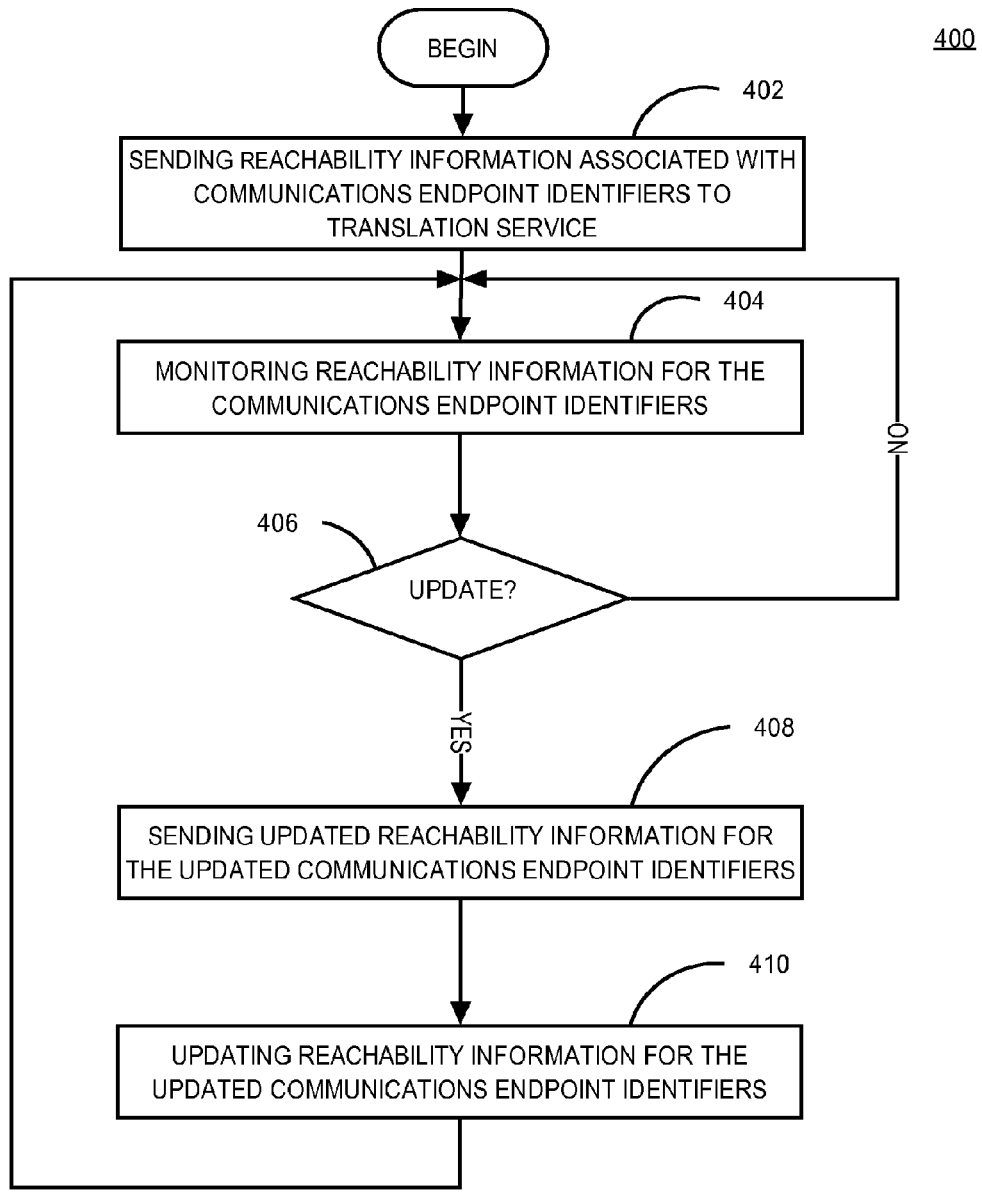
FIG. 4 is a flow chart illustrating steps for providing reachability information to the translation service, according to example embodiments of the present disclosure.

FIG. 4 illustrates a flow chart 400 of example steps by which an Internet communications service system such as for example Internet communications service system B2 21B2 can provide reachability information to translation service 50, according to some embodiments of the present disclosure. Referring to FIG. 4, in step 402, Internet communications service system B2 21B2 sends reachability information for one or more communications endpoint identifiers to translation service 50. In one example embodiment, Internet communications service system B2 21B2 sends the reachability information to translation service 50 according to a "push" or "pull" mechanism. In the "pull" mechanism, the Internet communications service system B2 21B2 waits for the translation service 50 to request reachability information and sends the reachability information to the translation server 50 in response to the request.

The request, for example, may specify one or more communications endpoint identifiers that the translation service 50 is requesting reachability information for. Internet communications service system B2 21B2 may respond with reachability information for just the specified communications endpoint identifiers. According to the "push" mechanism, the Internet communications service system B2 21B2 periodically or regularly initiates communication with the translation service 50 for the purpose of providing reachability information. For example, Internet communications service system B2 21B2 may provide reachability information for a communications endpoint identifier after service system B2 21B2 has detected a change to the reachability status of the communications endpoint identifier. The reachability information provided for a communications endpoint identifier in step 402 may include a reachability conclusion for the communications endpoint identifier (e.g., "reachable" or "unreachable") and/or may include raw reachability information for the communications endpoint identifier (e.g., quality-of-service, subscriber presence, and/or subscriber preference information for the communications endpoint identifier).

At step 404, the Internet communications service system B2 21B2 monitors the reachability and/or unreachability of communications endpoint identifiers of its subscribers. Next, at step 406, Internet communications service system B2 21B2 determines (or detects) whether a change to the reachability status for one or more of its subscribers' communications endpoint identifiers has occurred. If it is determined (or detected) that an update has occurred, the Internet communications service system B2 21B2, at step 408, communicates to translation service 50 an updated reachability information associated with the communications endpoint identifiers for which reachability status changes were determined or detected. Next, at step 410, translation service 50 can update the reachability information in translation database 51 for the changed communications endpoint identifiers. The process then returns to step 404 to continue to monitor for reachability status changes. Returning to step 406, if there are no reachability status changes, Internet communications service system B2 21B2 can continue to monitor for changes at step 404.

General-Purpose Computer System

Figure 5:
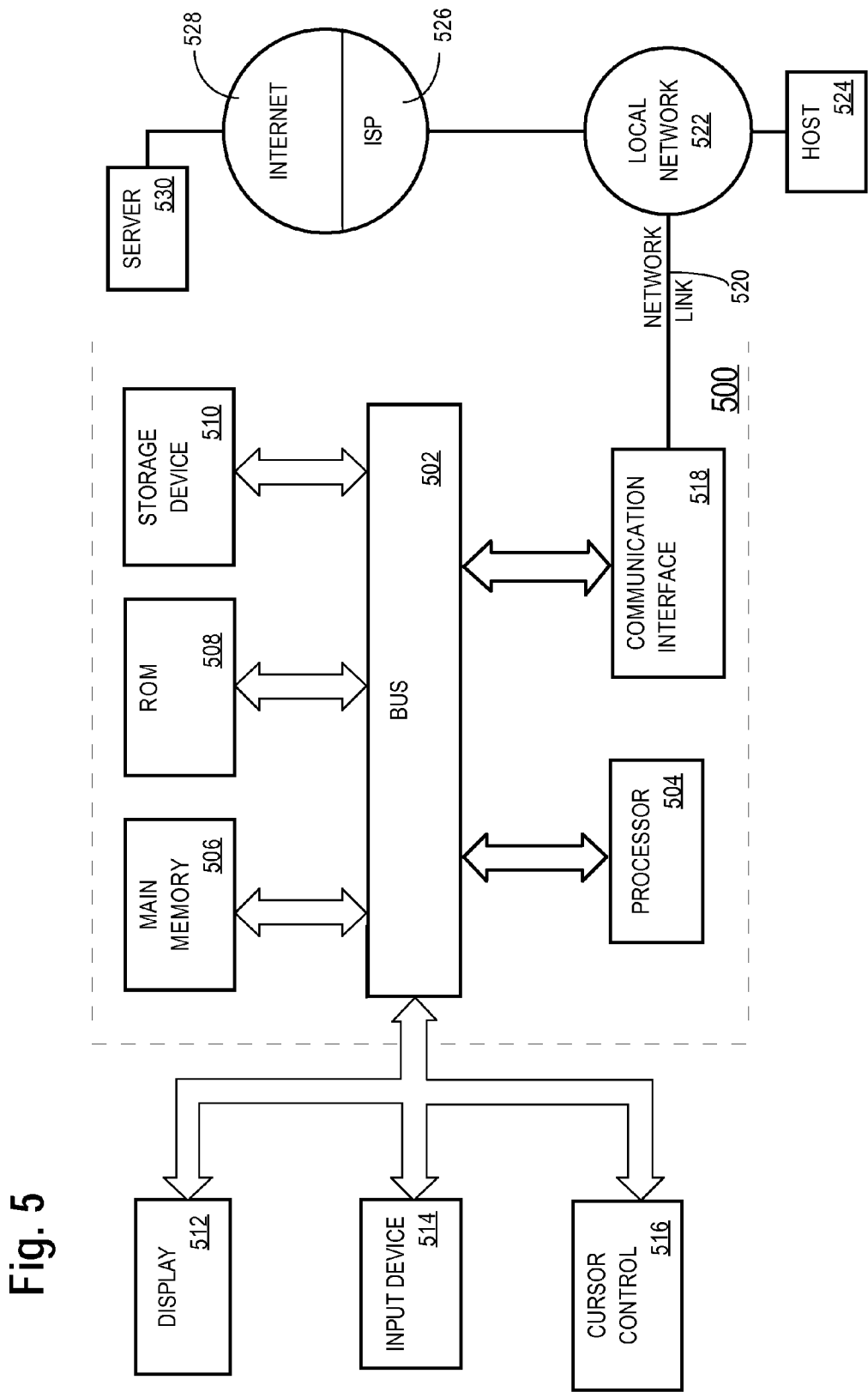
FIG. 5 is a block diagram that illustrates a computer system in which example embodiments of the present disclosure are deployed.

In some embodiments, the present disclosure is implemented on or by one or more conventional or general-purpose computer systems. For example, FIG. 5 is a block diagram that illustrates a computer system 500 in which example embodiments of the present disclosure may be embodied. Computer system 500 includes a bus 502 or other communication mechanism for communicating information, and a hardware processor 504 coupled with bus 502 for processing information. Hardware processor 504 may be, for example, a general purpose microprocessor or a system on a chip (SoC).

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk, optical disk, or solid-state drive is provided and coupled to bus 502 for storing information and instructions.

Computer system 500 may be coupled via bus 502 to a display 512, such as a liquid crystal display (LCD) or other electronic visual display, for displaying information to a computer user. Display 512 may also be a touch-sensitive display for communicating touch gesture (e.g., finger or stylus) input to processor 504.

An input device 514, including alphanumeric and other keys, is coupled to bus 502 for communicating information and command selections to processor 504.

Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more application-specific integrated circuits (ASICs), one or more field-programmable gate arrays (FPGAs), firmware, or program logic which, in combination with the computer system, causes or programs computer system 500 to be a special-purpose machine. According to some embodiments, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

A software system is typically provided for controlling the operating of computer system 500. The software system, which is usually stored in main memory 506 and on fixed storage (e.g., hard disk) 510, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 500. The application(s) may be "loaded" into main memory 506 from storage 510 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computer system in accordance with instructions from OS and/or application(s). The graphical user interface also serves to display the results of operation from the OS and application(s).

Extensions and Alternatives

In the foregoing disclosure, example embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A computer-implemented method of facilitating access by a subscriber over a communications network, the method comprising:
   acquiring a query message comprising a subscriber contact identifier associated with the subscriber;
   responsive to acquiring the query message:
      identifying a plurality of communications endpoint identifiers associated with the subscriber contact identifier, each communications endpoint identifier being associated with a communications device and reachability information, wherein the reachability information reflects a degree of subscriber accessibility via the communications device; and
      providing a response to the query message comprising at least one of the plurality of the communications endpoint identifiers, wherein the at least one of the plurality of the communications endpoint identifiers is selected based at least in part on the reachability information.

2. The method of claim 1, further comprising:
   using one of the at least one of the plurality of the identified communications endpoint identifiers to establish a VoIP call between a communications endpoint device of a calling party and a communications endpoint device of a called party; and wherein the query message is received from the communications endpoint device of the calling party.

3. The method of claim 1, wherein the at least one of the plurality of the communications endpoint identifiers are selected based at least in part on one of confidentially, privacy, monetary cost, and communications content information associated with one or more communications intended for the at least one of the communications devices associated with the selected at least one of the plurality of the communications endpoint identifiers.

4. The method of claim 1, wherein the subscriber contact identifier is an E.164 number.

5. The method of claim 1, wherein one of the at least one of the plurality of the communications endpoint identifiers is a uniform resource identifier (URI) or an e-mail address associated with the subscriber contact identifier.

6. The method of claim 1, wherein one of the at least one of the plurality of the communications endpoint identifiers is a set of serialized parameters identifying at least an Internet communications endpoint device and/or specifying a mechanism for accessing the Internet communications endpoint device.

7. The method of claim 1, wherein the reachability information indicates whether the communications device can be reached via the communications network.

8. The method of claim 1, wherein the reachability information comprises at least one of:
   a) information about a quality of service provided by a communications network to the communications device associated with the reachability information,
   b) subscriber presence information about whether the subscriber is available to be accessed via the communications device associated with the reachability information, and
   c) subscriber preference information about a level of preference for accessing the subscriber via the communications device associated with the reachability information.

9. The method of claim 1, further comprising:
   prior to obtaining the query message, receiving the reachability information from an Internet communications service system; and storing the received reachability information in association with the subscriber contact identifier in a translation database.

10. The method of claim 1, wherein the reachability information is associated with the plurality of the communications endpoint identifiers in a translation database; and wherein identifying the plurality of the communications endpoint identifiers associated with the subscriber contact identifier comprises obtaining at least one of the plurality of the communications endpoint identifier using the subscriber contact identifier as a database key.

11. The method of claim 1, further comprising:
   prior to receiving the query message, responsive to receiving a request to register an association between the subscriber contact identifier and the plurality of the communications endpoint identifiers, storing an association between the subscriber contact identifier and the plurality of the communications endpoint identifiers in a translation database.

12. A non-transitory computer readable medium that stores a set of instructions that are executable by at least one processor of an electronic device to cause the electronic device to perform a method of facilitating access by a subscriber over a communications network, the method comprising:
   acquiring a query message comprising a subscriber contact identifier associated with the subscriber;
   responsive to acquiring the query message:
      identifying a plurality of communications endpoint identifiers associated with the subscriber contact identifier, each communications endpoint identifier being associated with a communications device and reachability information, wherein the reachability information reflects a degree of subscriber accessibility via the communications device; and
      providing a response to the query message comprising at least one of the plurality of the communications endpoint identifiers, wherein the at least one of the plurality of the communications endpoint identifiers are selected based at least in part on the reachability information.

13. The non-transitory computer readable medium of claim 12, wherein the set of instructions that are executable by the at least one processor of the electronic device to cause the electronic device to further perform:

using one of the at least one of the plurality of the communications endpoint identifiers to establish a VoIP call between a communications endpoint device of a calling party and a communications endpoint device of a called party; and wherein the query message is received from the communications endpoint device of the calling party.

14. The non-transitory computer readable medium of claim 12, wherein the at least one of the plurality of the communications endpoint identifiers are selected based at least in part on one of confidentially, privacy, monetary cost, and communications content information associated with one or more communications intended for the communications device associated with the selected at least one of the plurality of the communications endpoint identifiers.

15. The non-transitory computer readable medium of claim 12, wherein the subscriber contact identifier is an E.164 number.

16. The non-transitory computer readable medium of claim 12, wherein the reachability information comprises at least one of:
   a) information about a quality of service provided by a communications network to the communications device associated with the reachability information,
   b) subscriber presence information about whether the subscriber is available to be accessed via the communications device associated with the reachability information, and
   c) subscriber preference information about a level of preference for accessing the subscriber via the communications device associated with the reachability information.

17. An apparatus for facilitating access to a subscriber over a communications network, the apparatus comprising:
   a memory device that stores a set of instructions; and
   at least one processor capable of executing the set of instructions to:
      acquire a query message comprising a subscriber contact identifier associated with the subscriber;
      responsive to acquiring the query message:
         identify a plurality of communications endpoint identifiers associated with the subscriber contact identifier, each communications endpoint identifier being associated with a communications device and reachability information, wherein the reachability information reflects a degree of subscriber accessibility via the communications device; and
         provide a response to the query message comprising at least one of the plurality of the communications endpoint identifiers, wherein the at least one of the plurality of the communications endpoint identifiers are selected based at least in part on the reachability information.

18. The apparatus of claim 17, wherein the at least one processor is further capable of executing the set of instructions to:
   use one of the at least one of the plurality of the communications endpoint identifiers to establish a VoIP call between a communications endpoint device of a calling party and a communications endpoint device of a called party; and wherein the query message is received from the communications endpoint device of the calling party.

19. The apparatus of claim 17, wherein the at least one of the plurality of the communications endpoint identifiers are selected based at least in part on one of confidentially, privacy, monetary cost, and communications content information associated with one or more communications intended for the at least one of communications devices associated with the selected at least one of the plurality of the communications endpoint identifiers.

20. The apparatus of claim 17, wherein the reachability information comprises at least one of:
   a) information about a quality of service provided by a communications network to the communications device associated with the reachability information,
   b) subscriber presence information about whether the subscriber is available to be accessed via the communications device associated with the reachability information, and
   c) subscriber preference information about a level of preference for accessing the subscriber via the communications device associated with the reachability information.

* * * * *